United States Patent Office 3,455,656
Patented July 15, 1969

3,455,656
DETECTION OF VOLATILE HYDRAZINE COMPOUNDS
Charles C. Roberts and David G. Hannan, Pittsburgh, Pa., assignors to Mine Safety Appliances Company, Pittsburgh, Pa., a corporation of Pennsylvania
No Drawing. Filed July 6, 1965, Ser. No. 469,839
Int. Cl. G01n 31/22, 33/22
U.S. Cl. 23—254    12 Claims

ABSTRACT OF THE DISCLOSURE

Volatile hydrazine compounds in other gases are detected by new colorimetric reagents in which a solid carrier is impregnated with solutions containing silicic and molybdic acids.

---

This invention relates to the colorimetric detection of volatile hydrazine compounds in other gases.

A variety of volatile hydrazine compounds are used as components of missile fuels and for other industrial purposes, examples being hydrazine, hydrazine hydrate and substituted hydrazines, for example, volatile alkyl hydrazines such as methyl and ethyl hydrazines, and unsymmetrical dimethyl hydrazine (UDMH).

It is an object of this invention to provide a simple, rapid and reliable method of detecting the presence of volatile hydrazine compounds in gases, particularly air, that may be practiced by non-technical persons, and that is satisfactory for field and plant use. Another object of this invention is to provide a visual warning of the exhaustion of gas mask canisters used for protection against volatile hydrazine compounds. Another object is to provide a reagent for practicing the foregoing methods that is readily and easily prepared from commercially available and inexpensive materials. Other objects will be apparent from the following description and claims.

This invention is predicated on our discovery that when air or other gas containing volatile hydrazine compounds is passed into contact with a composition of a silicic acid and a molybdic acid on a solid carrier, a readily observable color change occurs promptly.

The carrier does not enter into the color producing reaction, but merely serves as an inert physical carrier for the reagent, except in the case of the preferred silica gel carrier that is described in detail hereinafter. Suitable inert carriers include papers, for example, coated waterproofed papers and filter papers, membrane filter materials, glass beads or plates, glass beads coated with a film of absorbent clay, and granular absorbent materials, for example, pumice.

In the presence of volatile hydrazine compounds the reagent undergoes a color change from yellow or yellow-green to blue or blue-green giving a clearly evident and visual contrast between the unaffected indicator and altered indicator.

In the practice of this invention the inert carrier is impregnated with a reagent solution, preferably an aqueous solution, and dried. The molybdic acid may be supplied as a solution of a molybdic acid, such as $H_2MoO_4$ or as a solution of a water soluble molybdate acidified with sulfuric acid. The silicic acid may be provided as a solution of a soluble silicate, such as sodium, potassium and rubidium metasilicates and orthosilicates, acidified with sulfuric acid.

In an illustrative example of this invention, a reagent solution is formed by mixing 100 cc. of water, 0.02 to 20 g., preferably 2 g. of sodium metasilicate ($Na_2SiO_3 \cdot 9H_2O$), 0.02 to 20 g., preferably 2 g. of molybdic acid monohydrate, and 1 to 20 cc., preferably 7.5 cc. of 10% sulfuric acid, and 0 to 10 cc., preferably 1 cc. of glycerine. Suitably reagent solutions may contain for each 100 cc. of water between about 0.02 to 2 g. of silicon, 0.1 to 10 g. of molybdenum, 0.002 to 0.04 gram-equivalents of sulfuric acid; there are preferably between about 1 and 10 grams of molybdenum for each gram of silica.

A portion of the reagent solution is sprayed on a coated waterproof paper, and oven dried at 120° C. for several minutes to form a coated yellow-green indicating paper that turns blue-green on exposure to the aforesaid volatile hydrazine compounds. Similarly, indicators are prepared by impregnating and drying filter paper and membrane filter material. It is preferred to use a reagent containing glycerine for use with papers or membrane filters. In another example, reagent solution containing no glycerine was placed on a glass plate and evaporated to dryness, leaving an adherent yellow-green coating on the plate that turns to blue-green on exposure to volatile hydrazine compounds. We have found that such indicators will discolor on exposure to ultraviolet radiation, and indicators must be protected from such radiation for long storage, as by being kept in light-tight containers or protected by suitable ultraviolet filters.

SILICA GEL CARRIER

Granular silica gel is the carrier of the preferred embodiment of this invention. When silica gel is used, the silicic acid component is provided by acidification of the silica gel in the presence of molybdic acid which may be formed by reaction of a water soluble molybdate with a mineral acid. The bulk of the silica gel is unreacted and acts as inert carrier, and the physical appearance of the gel, other than color, is not altered. Illustrative of the indicator using a silica gel carrier, 100 cc. of 2–15%, preferably 10%, aqueous solution of ammonium molybdate solution are mixed with 100 cc. of silica gel, suitably 8–60 mesh, containing 20–30% water, and 1 to 10 cc., preferably 10 cc., of 10% sulfuric acid is added to the mixture, turning it a bright yellow-green color. The mixture is dried, suitably at 120° C., to form a free flowing dry bright yellow-green granular indicator. Suitable reagents may use for each 100 cc. of silica gel between about 1 to 8 grams of molybdenum and between about 0.002 and 0.02 gram-equivalents of mineral acid. Other mineral acids may be used in place of the sulfuric acid. For example, indicators may be prepared substituting for the sulfuric caid 10% phosphoric acid, 10% hydrochloric acid, 10% nitric acid or 5% chromic acid. Sulfuric acid is generally preferred as the resultant indicator is more sensitive than those prepared using other mineral acids. The color and response of various indicators using the aforesaid preferred reagent proportions are set forth in the table below.

TABLE

| | | Least detectable concentratic (p.p.m.) | | | |
|---|---|---|---|---|---|
| Acid used | Color | UDMH | Hydrazine | Monoethyl-hydrazine | Stain color |
| Sulfuric | Yellow-green | 2.5 | 10 | 10 | Blue-green. |
| Phosphoric | do | 10 | 10 | 100 | Blue. |
| Hydrochloric | Yellow | 10 | 10 | 10 | Blue-green. |
| Nitric | Yellow-green | 10 | 10 | 10 | Do. |
| Chromic | Yellow | 10 | 100 | 100 | Green. |

The exact nature of the interaction of the silica gel with the other reagent components is not known, but it results in a superior indicator that is extremely stable and is not sensitive to ultraviolet radiation, as is the case when using carriers other than silica gel. Also, any mineral acid may be used in the preparation of silica gel indicators, while only sulfuric acid is suitable for indicators having carriers other than silica gel.

Satisfactory response of granular indicator to the presence of volatile hydrazine compounds is had by passing the atmosphere, as by an aspirator or a fixed flow rate pump, such as that described in U.S. Patent 3,166,938 to Weyrauch et al., to be tested through the indicator confined in a container having a transparent portion through which the reagent may be viewed. When used with gas mask canisters a satisfactory way for the protection of personnel resides in the use of canisters of the gas mask type such as are shown in Patent No. 1,537,519 to M. Yablick, as well as in various other patents. If the canister fill is not of this reagent it suffices to position a thin layer of the reagent against the canister window. In the presence of volatile hydrazine compounds the color change is visible through the canister window beginning at the inlet end of the canister and progressing toward the outlet and as the reagent is progressively reacted. Thus the position of the color front gives an immediate indication of the degree of exhaustion of the canister, and when the color change has occurred up toward the outlet it is evident that the discard point has been reached.

Alternatively, for spot checks the reagent may be disposed in a glass or other transparent tube of small diameter the ends of which are sealed as described in U.S. Patent 2,174,349 to John B. Littlefield. The reagent tube is used by breaking the seals and aspirating the atmosphere to be tested through it, the appearance of the color change indicating the presence of volatile hydrazine compounds.

According to the provisions of the patent statutes, we have explained the principle and mode of practice of our invention and have described what we now consider to represent its best embodiment. However, we desire to have it understood that, within the scope of the appended claims, the invention may be practiced otherwise than as specifically described.

We claim:

1. A colorimetric indicator for detecting volatile hydrazine compounds consisting essentially of an inert carrier impregnated with the substantially dry residue of an aqueous solution of silicic and molybdic acids.

2. A colorimetric indicator for detecting volatile hydrazine compounds consisting essentially of a paper impregnated with the substantially dry residue of a reagent consisting essentially of an aqueous solution of (1) a molybdenum compound selected from the group consisting of molybdic acid, ammonium molybdate and alkali metal molybdates, (2) a water soluble silica compound selected from the group consisting of alkali metal orthosilicates and alkali metal metasilicates, and (3) sulfuric acid.

3. An indicator according to claim 2 in proportions to provide 1 to 10 g. of molybdenum for each gram of silicon.

4. An indicator according to claim 2 in which the reagent solution contains for each 100 cc. of water from about 0.02 to 2 grams of silicon, 0.1 to 10 grams of molybdenum, 0.02 to .04 gram-equivalents of sulfuric acid, and 0 to 10 cc. of glycerine.

5. An indicator according to claim 4 in which the silicon is provided as sodium silicate and the molybdenum is provided as molybdic acid.

6. A colorimetric indicator for detecting volatile hydrazine compounds consisting essentially of silica gel impregnated with a water soluble molybdate and a mineral acid.

7. An indicator according to claim 6 in which the mineral acid is sulfuric acid.

8. A colorimetric indicator for detecting volatile hydrazine compounds consisting essentially of silica gel impregnated with a water soluble molybdate and a mineral acid in proportion to provide from about 1 to 8 grams of molybdenum and .002 to .02 gram-equivalents of mineral acid per 100 cc. of silica gel.

9. A reagent according to claim 8 in which the molybdenum is provided as ammonium molybdate and the mineral acid is sulfuric acid.

10. A reagent according to claim 9 in which there is about 5 g. of molybdenum.

11. A gas detection device comprising a casing provided with sealed inlet and outlet openings and having disposed therein a body of colorimetric indicator consisting essentially of granular silica gel impregnated with a soluble molybdate and a mineral acid.

12. A gas detection device according to claim 11 in which the soluble molybdate is ammonium molybdate and the mineral acid is sulfuric acid.

References Cited

UNITED STATES PATENTS

| | | | |
|---|---|---|---|
| 3,131,030 | 4/1964 | Grosskopf | 23—254 |
| 3,193,355 | 7/1965 | Fuhrmann | 23—230 |

OTHER REFERENCES

Analytical Abstracts, abstr. No. 120, January 1959, vol. 6.

Analytical Abstracts, abstr. No. 369, January 1963, vol. 10.

Analytical Abstracts, abstr. No. 1165, April 1966, vol. 13.

MORRIS O. WOLK, Primary Examiner

ELLIOTT A. KATZ, Assistant Examiner

U.S. Cl. X.R.

23—253; 252—408